US012748317B2

(12) United States Patent
Danziger

(10) Patent No.: US 12,748,317 B2
(45) Date of Patent: Sep. 29, 2026

(54) OPTICAL SYSTEM HAVING PRISM BETWEEN POLARIZING BEAM SPLITTER AND LIGHTGUIDE

(71) Applicant: Lumus Ltd., Ness Ziona (IL)

(72) Inventor: Yochay Danziger, Kfar Vradim (IL)

(73) Assignee: Lumus Ltd., Ness Ziona (IL)

( * ) Notice: Subject to any disclaimer, the term of this patent is extended or adjusted under 35 U.S.C. 154(b) by 16 days.

(21) Appl. No.: 19/125,383

(22) PCT Filed: May 9, 2024

(86) PCT No.: PCT/IL2024/050452

§ 371 (c)(1),
(2) Date: Apr. 29, 2025

(87) PCT Pub. No.: WO2024/246887

PCT Pub. Date: Dec. 5, 2024

(65) Prior Publication Data

US 2026/0010013 A1 Jan. 8, 2026

Related U.S. Application Data

(60) Provisional application No. 63/527,848, filed on Jul. 20, 2023, provisional application No. 63/521,889, (Continued)

(51) Int. Cl.
*G02B 5/04* (2006.01)
*G02B 5/30* (2006.01)
(Continued)

(52) U.S. Cl.
CPC ............ *G02B 27/283* (2013.01); *G02B 5/04* (2013.01); *G02B 27/0172* (2013.01); (Continued)

(58) Field of Classification Search
CPC ........ G02B 5/04; G02B 5/30; G02B 27/0172; G02B 27/0922; G02B 27/283; G02B 27/30
See application file for complete search history.

(56) References Cited

U.S. PATENT DOCUMENTS 7,577,326 B2 8/2009 Amitai
8,000,020 B2 8/2011 Amitai
(Continued)

FOREIGN PATENT DOCUMENTS

WO 2020157650 8/2020
WO 2023058034 4/2023
(Continued)

*Primary Examiner* — Ryan S Dunning
(74) *Attorney, Agent, or Firm* — Rivka Friedman

(57) ABSTRACT

An optical system includes a lightguide and an image projecting arrangement. The image projecting arrangement includes a polarizing-beam-splitter prism having a diagonal polarizing beam splitter surface reflecting light from an image-generating matrix to reflective collimating optics. A coupling prism is deployed between the polarizing beam splitter surface and a lightguide entrance, providing a coupling surface that is coplanar with, or parallel to, one of the parallel major surfaces of the lightguide. A reference length RL is defined as a distance along the optical axis from a principal plane of the collimating optics to the polarizing beam splitter surface. Both a first light path from the image plane to the principal plane and a second light path from the principal plane to the lightguide entrance have a length less than 3×RL.

13 Claims, 7 Drawing Sheets

Related U.S. Application Data filed on Jun. 20, 2023, provisional application No. 63/469,403, filed on May 28, 2023.

(51) Int. Cl.

| | |
|---|---|
| ***G02B 27/01*** | (2006.01) |
| ***G02B 27/09*** | (2006.01) |
| ***G02B 27/28*** | (2006.01) |
| ***G02B 27/30*** | (2006.01) |

(52) U.S. Cl.

CPC ......... *G02B 27/0922* (2013.01); *G02B 27/30* (2013.01); *G02B 5/30* (2013.01)

(56) References Cited

U.S. PATENT DOCUMENTS

| | | | |
|---|---|---|---|
| 8,432,614 | B2 | 4/2013 | Amitai |
| 9,448,408 | B2 | 9/2016 | Amitai et al. |
| 9,488,840 | B2 | 11/2016 | Mansharof et al. |
| 10,739,598 | B2 | 8/2020 | Ofir |
| 10,809,528 | B2 | 10/2020 | Amitai |
| 10,908,426 | B2 | 2/2021 | Amitai |
| 10,969,590 | B1 | 4/2021 | Danziger et al. |
| 11,415,812 | B2 | 8/2022 | Mansharof |
| 11,892,761 | B2 | 2/2024 | Chriki et al. |
| 11,927,872 | B2 | 3/2024 | Danziger |
| 12,124,050 | B2 | 10/2024 | Danziger et al. |
| 2018/0120559 | A1 | 5/2018 | Yeoh et al. |
| 2018/0157057 | A1 | 6/2018 | Gelberg et al. |
| 2018/0210202 | A1 | 7/2018 | Danziger |
| 2022/0342216 | A1 | 10/2022 | Danziger et al. |
| 2023/0121391 | A1 | 4/2023 | Danziger et al. |
| 2023/0296968 | A1 | 9/2023 | Danziger |
| 2024/0098230 | A1 | 3/2024 | Danziger |
| 2024/0337844 | A1 | 10/2024 | Danziger et al. |

FOREIGN PATENT DOCUMENTS

| | | |
|---|---|---|
| WO | 2024038458 | 2/2024 |
| WO | 2024116169 | 6/2024 |

OPTICAL SYSTEM HAVING PRISM BETWEEN POLARIZING BEAM SPLITTER AND LIGHTGUIDE

FIELD AND BACKGROUND OF THE INVENTION

The present invention relates to optical systems and, in particular, it concerns compact image projectors that are integrated together with lightguides.

U.S. Pat. No. 10,546,417 discloses an advantageous compact configuration which integrates an image projector with a lightguide. FIGS. 16 and 17 of that patent are reproduced here as FIGS. 1A and 1B, respectively, with the original numbering. These drawings illustrate an image projector which includes two polarizing beam splitter (PBS) prisms. A first PBS prism 500 receives s-polarized input illumination 505 which is reflected by a PBS surface 507 towards a reflective, polarization-modulating spatial light modulator, such as an LCOS chip 509. The selectively modulated p-polarized divergent image light 511 passes through PBS surface 507 and is converted by a half-wave retarder plate (unnumbered) to s-polarization on entry into a second PBS prism 526 so as to be reflected at a second PBS surface 513 towards collimating reflective optics 515 with a quarter-wave retarder plate (unnumbered). Reflective optics 515 collimates the image light into a collimated image with a field of view 517 extending from steepest angle rays **518*a* to shallowest angle rays 518*b*, with p-polarization, which traverses PBS surface 513 for coupling into a lightguide 503. Coupling into the lightguide is achieved in part by reflection at a surface 528 provided by a lower part of PBS prism 526 forming a continuation of one of the surfaces of the lightguide. FIGS. 1A and 1B differ in the range of angles used for the coupled-in image, with FIG. 1A presenting a relatively high-angle image while FIG. 1B illustrates a shallower-angle injected image. The description of any reference numerals of FIGS. 1A and 1**B not mentioned above may be found in the '417 patent itself.

SUMMARY OF THE INVENTION

The present invention is an optical system.

According to the teachings of an embodiment of the present invention there is provided, an optical system comprising: (a) a lightguide having a pair of parallel major surfaces supporting propagation of image light by internal reflection at the major surfaces, the lightguide having a lightguide entrance; (b) an image projecting arrangement for generating a collimated image for introduction into the lightguide, the image projecting arrangement comprising: (i) a polarizing-beam-splitter prism having a first face, a second face, and a diagonal polarizing beam splitter surface, (ii) an image-generating matrix associated with the first face, the image-generating matrix defining an image plane, and (iii) reflective collimating optics associated with the second face and deployed to collimate image light from the image plane reflected by the polarizing beam splitter surface, the reflective collimating optics having a principal plane and an optical axis; and (c) a coupling prism between the polarizing beam splitter surface and the lightguide entrance, the coupling prism providing a coupling surface that is coplanar with, or parallel to, one of the parallel major surfaces, wherein the lightguide and the coupling surface are inclined relative to the optical axis so that the collimated image from the reflective collimating optics passing through the polarizing beam splitter surface enters the lightguide entrance, partly directly and partly after reflection from the coupling surface, at angles undergoing internal reflection within the lightguide, and wherein a reference length RL is defined as a distance along the optical axis from the principal plane to the polarizing beam splitter surface, a first light path from the image plane to the principal plane having a length less than 3×RL and a second light path from the principal plane to the lightguide entrance having a length less than 3×RL.

According to a further feature of an embodiment of the present invention, the second light path from the principal plane to the lightguide entrance has a length less than 2×RL.

According to a further feature of an embodiment of the present invention, light rays of the collimated image entering the lightguide entrance span an angular field of view, and wherein the angular field of view is provided by image light reaching the reflective collimating optics from the image plane after reflection from an active area of the polarizing beam splitter surface, the active area extending on both sides of a plane of the coupling surface.

According to a further feature of an embodiment of the present invention, the entrance to the lightguide is defined by an optical cutoff edge between the lightguide and the coupling prism, and wherein a plane passing through the optical cutoff edge perpendicular to the major surfaces intersects with the active area of the polarizing beam splitter surface.

According to a further feature of an embodiment of the present invention, the image-generating matrix is a micro-LED array.

According to a further feature of an embodiment of the present invention, there is also provided a field lens arrangement comprising at least one lens, the field lens arrangement being between the micro-LED array and the first face of the polarizing-beam-splitter prism.

According to a further feature of an embodiment of the present invention, at least one lens of the field lens arrangement is integrated with the micro-LED array.

According to a further feature of an embodiment of the present invention, the image-generating matrix is a reflective spatial light modulator (SLM), the optical system further comprising an illumination arrangement interposed between the SLM and the first face of the polarizing-beam-splitter prism, the illumination arrangement comprising an illumination lightguide having two mutually-parallel surfaces for guiding illumination across the SLM by internal reflection within the illumination lightguide, the illumination lightguide including a set of internal partially-reflecting surfaces for progressively redirecting the illumination out of the illumination lightguide towards the SLM.

According to a further feature of an embodiment of the present invention, there is also provided a field lens arrangement comprising at least one lens, the field lens arrangement being between the SLM and the first face of the polarizing-beam-splitter prism.

According to a further feature of an embodiment of the present invention, at least one lens of the field lens arrangement is integrated with the SLM.

There is also provided according to the teachings of an embodiment of the present invention, an optical system comprising: (a) a lightguide having a pair of parallel major surfaces supporting propagation of image light by internal reflection at the major surfaces, the lightguide having a lightguide entrance; (b) an image projecting arrangement for generating a collimated image for introduction into the lightguide, the image projecting arrangement comprising: (i) first, second and third micro-LED arrays configured for generating, respectively, images of first, second and third colors, (ii) a dichroic combiner having first, second and third input surfaces supporting, respectively, the first, second and third micro-LED arrays, the dichroic combiner including a first diagonally-deployed dichroic reflector, selectively reflective for the first color and transmissive for the second color and the third color, and a second diagonally-deployed dichroic reflector, selectively reflective for the third color and transmissive for the second color, (iii) a polarizing-beam-splitter prism, associated with the dichroic combiner, having a diagonal polarizing beam splitter surface, and (iv) reflective collimating optics associated with a face of the polarizing-beam-splitter prism and deployed to collimate image light from the first, second and third micro-LED arrays that was combined by the dichroic combiner and reflected by the polarizing beam splitter surface, the reflective collimating optics having a principal plane and an optical axis; and (c) a coupling prism between the polarizing beam splitter surface and the lightguide entrance, the coupling prism providing a coupling surface that is coplanar with, or parallel to, one of the parallel major surfaces, wherein the lightguide and the coupling surface are inclined relative to the optical axis so that the collimated image from the reflective collimating optics passing through the polarizing beam splitter surface enters the lightguide entrance, partly directly and partly after reflection from the coupling surface, at angles undergoing internal reflection within the lightguide, and wherein a reference length RL is defined as a distance along the optical axis from the principal plane to the polarizing beam splitter surface, a light path from the principal plane to the lightguide entrance having a length less than 3×RL, and preferably less than 2×RL.

According to a further feature of an embodiment of the present invention, the second dichroic reflector is transparent to the first color, and wherein the second dichroic reflector is deployed non-parallel to the first dichroic reflector so as to intersect the first dichroic reflector.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an optical system providing a compact image projector integrated together with a lightguide.

The principles and operation of optical systems according to the present invention may be better understood with reference to the drawings and the accompanying description.

By way of introduction, the present invention relates to various improvements over the compact optical systems described above with reference to FIGS. 1A and 1B that employ compact image projectors integrated with a lightguide for delivering an image to the eye of a viewer, typically in the context of an augmented reality display. In certain most preferred implementations, the optical system includes a two-dimensional optical aperture expansion lightguide. The overall architecture of such an arrangement is illustrated schematically in FIGS. 2A and 2B.

Figure 2A:
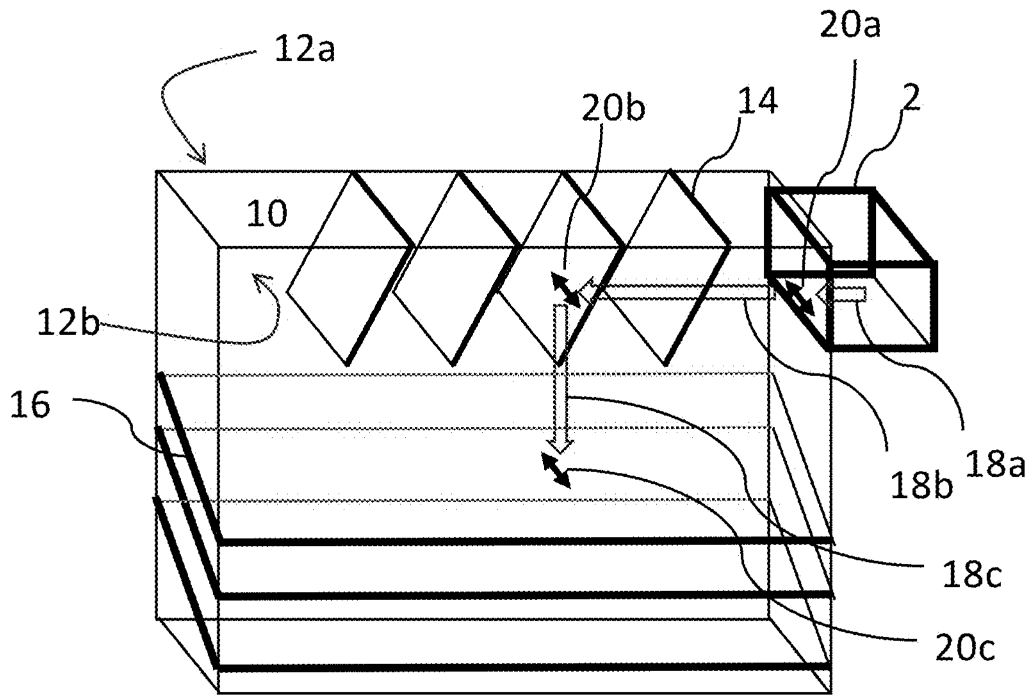
FIG. 2A is a schematic isometric illustration of an optical system illustrating propagation of an image from a projector through a two-dimensional aperture expansion lightguide.
Figure 2B:
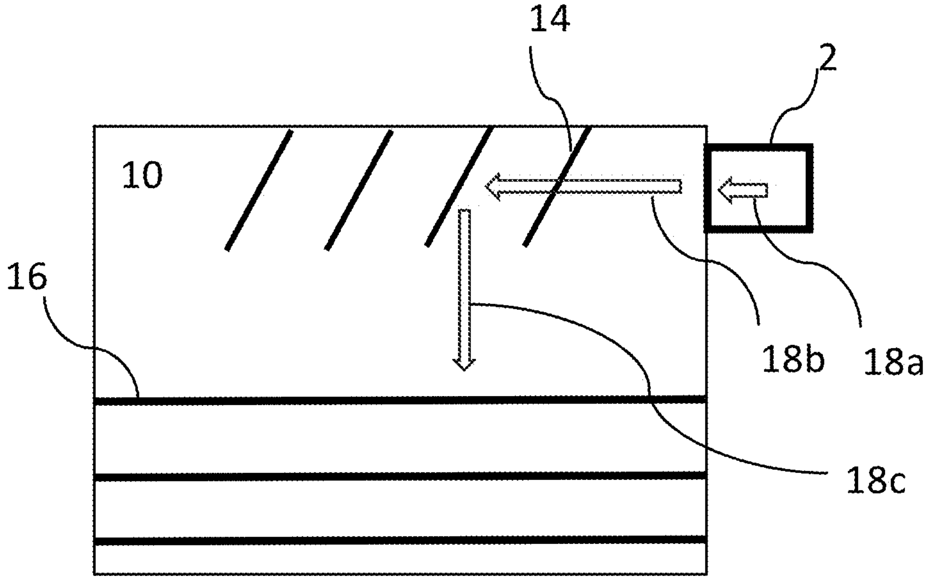
FIG. 2B is a schematic front view of the optical system of FIG. 2A.

FIGS. 2A and 2B show a schematic isometric view and side view of image projector 2 attached to lightguide 10 having front and back parallel faces 12*a* and 12*b*. The lightguide 10 incorporates a first set of partial reflectors (also referred to as "facets") 14 that are perpendicular to lightguide faces 12*a* and 12*b*. A second set of parallel partial reflectors (facets) 16 are obliquely angled relative to the lightguide faces.

A beam of light 18*a* represents schematically a collimated image that originates from projector 2 having a polarization orientation 20*a* set perpendicular to faces 12*a* and 12*b* (which can be referred to as P-polarization relative to those faces). This beam propagates within lightguide 10, represented as 18*b*, while maintaining its polarization. Although illustrated schematically as a single arrow, the light is angled so as to propagate by internal reflection, reflecting from faces 12*a* and 12*b*. The beam 18*b* impinges on facets 14. Since these facets 14 are perpendicular to faces 12*a* and 12*b*, the polarization 20*b* of the impinging beam 18*b* is parallel to the surfaces of facets 14, corresponding to S-polarization relative to those facets.

The partially reflected beam 18*c* (shown from one facet, but present as a partially reflected beam from each of the facets) impinges on facets 16. Because of the different orientation of facets 16, the impinging beam has P-polarization relative to these facets.

In certain cases, the design of multilayer dielectric coatings to provide the desired partial reflectivity and angular dependence for facets 14 and/or 16 may be easier for S-polarization (relative to the facets) than for P-polarization. There may therefore be an advantage to projector arrangements which introduce P-polarization into lightguide 10, so that the image is inherently S-polarized relative to facets 14. This P-polarization injection may be achieved by certain embodiments of the present invention described below. Optionally, a half-wave retarder plate may be included within lightguide 10 interposed between the two sets of facets in order to convert the light reaching facets 16 to be S-polarization relative to those facets.

Figure 3:
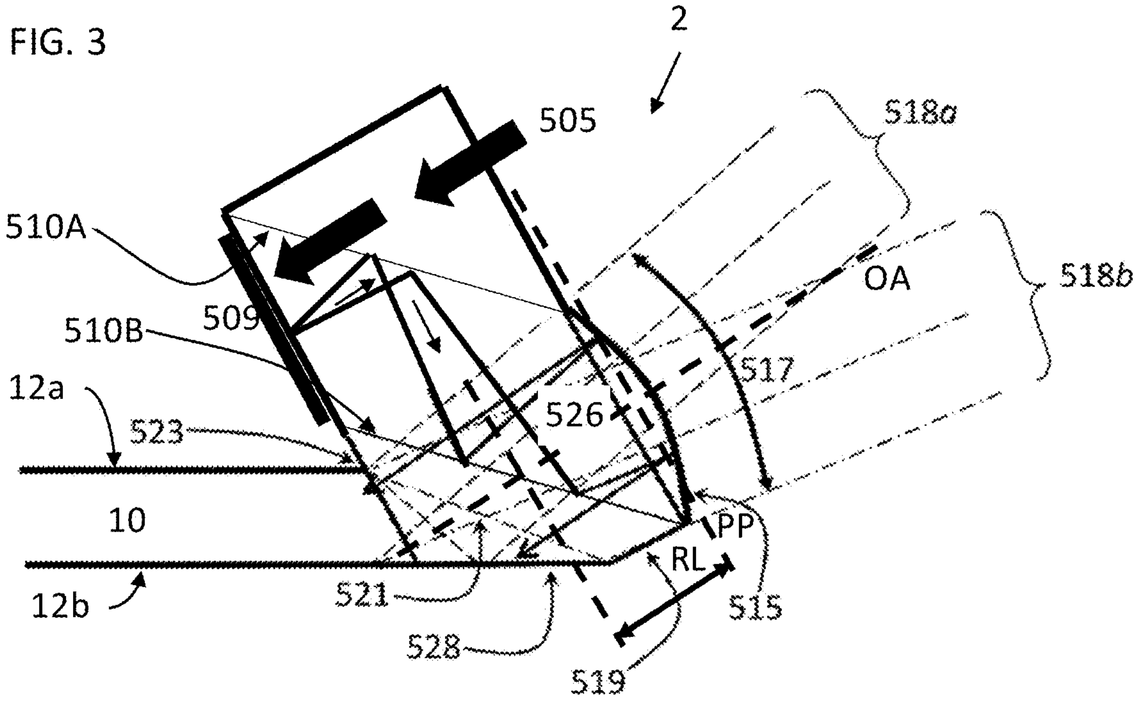
FIG. 3 is a schematic side view of an optical system, constructed and operative according to the teachings of an embodiment of the present invention, including a compact image projector integrated with a light guide.

Turning now to FIG. 3, this illustrates an optical system according to a first aspect of the present invention. The structure and function of this optical system is generally similar to that of FIG. 1A but achieves a simplification of the structure by implementing the part of the PBS prism between PBS surfaces 510A and 510B as a single block. This facilitates production of PBS surfaces 510A and 510B integrated, preferably as dielectric coatings, on opposite faces of a parallel sided prism. This construction is enabled by repositioning the reflective polarization-modifying spatial light modulator (SLM) so that no polarization rotating element is needed in between the PBS surfaces. The combination of the above double PBS with a surface 528 of the lower part of the PBS prism (coupling prism) which is an extension of, or parallel to, a surface of the lightguide enables a compact and efficient implementation of the optical system.

Figure 1A:
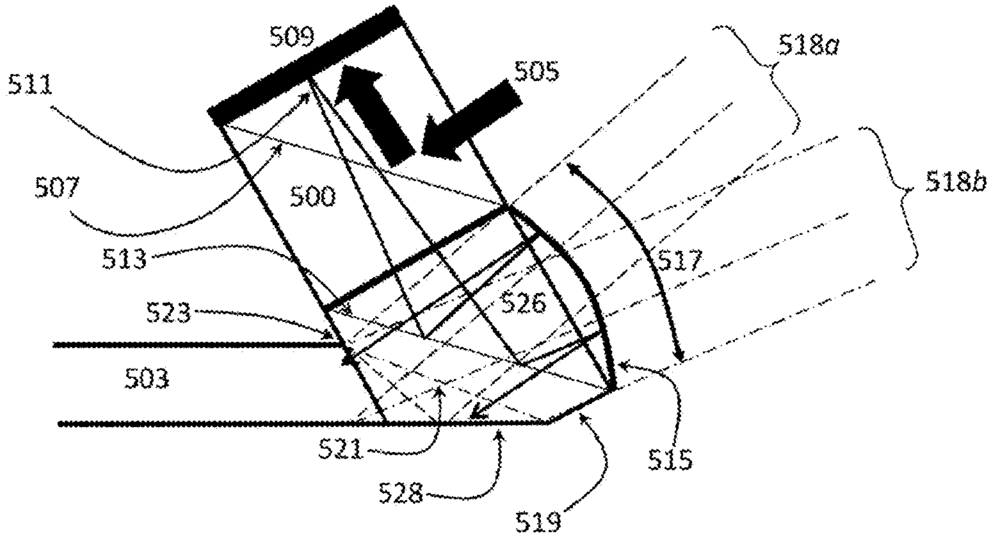
FIG. 1A (PRIOR ART)
FIGS. 1A and 1B, described above, correspond to FIGS. 16 and 17, respectively, of U.S. Pat. No. 10,546,417.
Figure 1B:
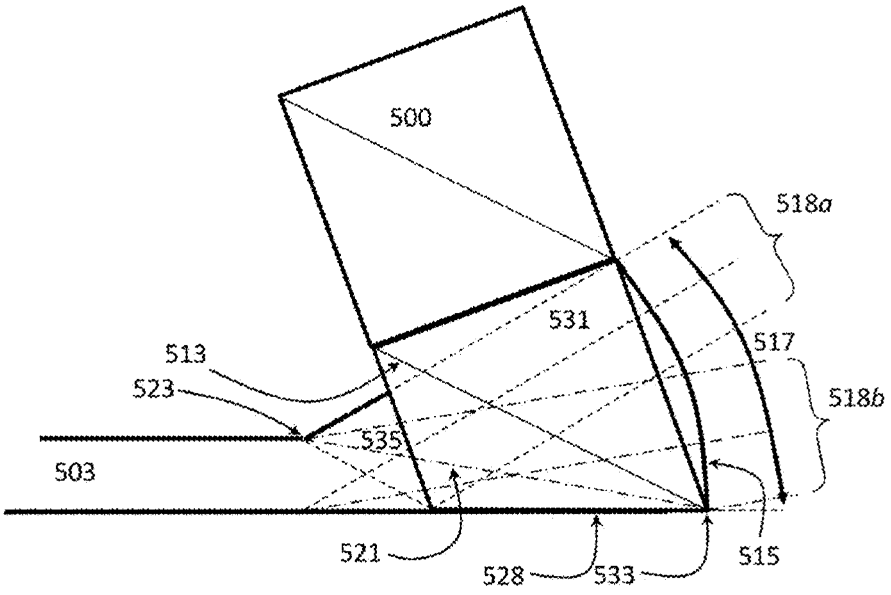
FIG. 1B (PRIOR ART)

All other features of this configuration are similar in structure and function to those of FIG. 1A, above, and are labeled with similar reference numerals. This configuration can also be implemented at a shallower injection angle (analogous to FIG. 1B).

Figure 4A:
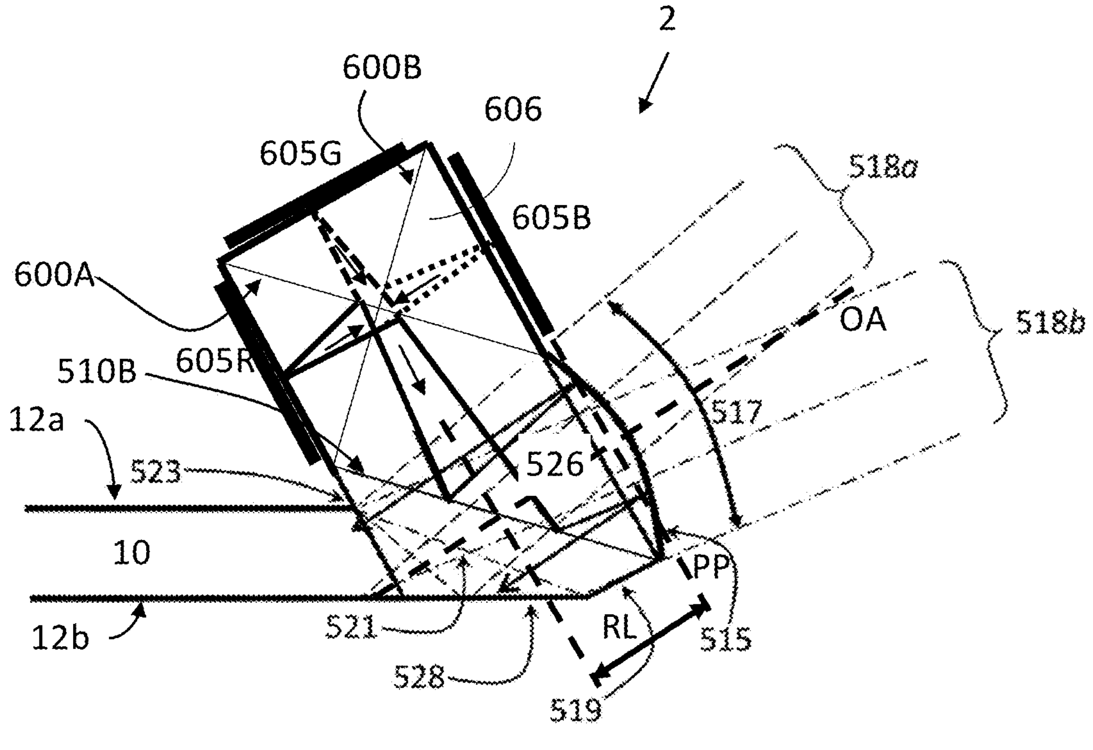
FIG. 4A is a schematic side view of a further optical system, constructed and operative according to the teachings of an embodiment of the present invention, including a compact image projector, employing a dichroic combiner arrangement and micro-LED arrays, integrated with a light guide.

Turning now to FIG. 4A, an optical system according to the teachings of an embodiment of the present invention is adapted to employ active-matrix image generators, such as OLED arrays or more preferably micro-LED arrays, to generate an image. In this implementation, a set of three separate arrays, designated 605R, 605G and 605B, each provide a different color component of an image, shown as solid, dashed and dotted lines, respectively.

Thus, in addition to a lightguide 10 having a pair of parallel major surfaces 12*a* and 12*b*, the optical system includes an image projecting arrangement 2 for generating a collimated image for introduction into the lightguide including first, second and third micro-LED arrays 605R, 605G and 605B configured for generating, respectively, images of first, second and third colors, such as red, green and blue for full color image generation. A dichroic combiner 606 has first, second and third input surfaces supporting, respectively, the first, second and third micro-LED arrays 605R, 605G and 605B. Dichroic combiner 606 includes a first diagonally deployed dichroic reflector 600A, selectively reflective for the first color and transmissive for the second color and the third color, and a second diagonally deployed dichroic reflector 600B, selectively reflective for the third color and transmissive for the second color.

The remainder of the image projecting arrangement, as before, includes a polarizing-beam-splitter prism 526, associated with the dichroic combiner, having a diagonal polarizing beam splitter surface 510B, and reflective collimating optics 515 associated with a face of the polarizing-beam-splitter prism 526 and deployed to collimate image light from the first, second and third micro-LED arrays that was combined by the dichroic combiner 606 and reflected by the polarizing beam splitter surface 510B. Reflective collimating optics 515 has a principal plane PP and an optical axis OA.

A coupling prism, which may be the entirety of the prism between polarizing beam splitter surface 510B and the lightguide entrance, provides a coupling surface 528 that is coplanar with, or parallel to, one of the parallel major surfaces of lightguide 10.

The lightguide 10 and coupling surface 528 are inclined relative to the optical axis OA so that the collimated image from the reflective collimating optics 515 passing through polarizing beam splitter surface 510B enters the lightguide entrance, partly directly and partly after reflection from the coupling surface 528, at angles undergoing internal reflection within the lightguide 10.

The result of this structure is an advantageously compact optical arrangement. Throughout this document, the compactness of the various configurations is quantified by referring to a “reference length” RL defined as a distance along the optical axis OA from the principal plane PP to the polarizing beam splitter surface (i.e., where the OA intersects the plane of the PBS surface 510B). In this implementation, a light path from the principal plane to the lightguide entrance preferably has a length less than 3×RL, and in some particularly preferred cases less than 2×RL. Optimal reduction of the distance from the collimating optics to the lightguide entrance can be achieved using a coupling prism configuration such as will be described below with reference to FIG. 6. The light path from the image generating planes (the micro-LED arrays) to the principal plane of the reflective collimating optics, which corresponds to the focal length of the collimating optics, is preferably no more than 4×RL.

Figure 4B:
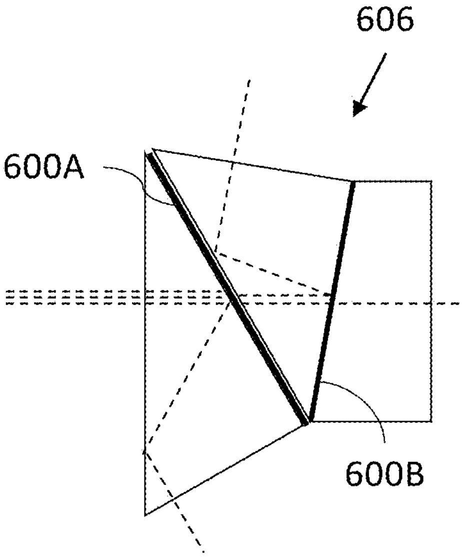
FIG. 4B is a schematic side view of an alternative implementation of a dichroic combiner arrangement suitable for use in the optical system of FIG. 4A.

In the embodiment of FIG. 4A, the dichroic combiner 606 (which may be referred to as a “trichroic combiner” since it is combining three different color sources) is illustrated as an “X-cube”, where the first and second dichroic reflectors 600A and 600B intersect with each other. In this case, second dichroic reflector 600B is implemented so as to also be transparent to the first color, so that it does not interfere with the first color reaching the entirety of the first dichroic reflector 600A. In certain cases, alternative trichroic prism configurations may be preferred, such as the trichroic combiner prism illustrated in FIG. 4B, which corresponds to the prism structure common in 3CCD cameras. In this case, light of the first color does not reach the second dichroic reflector, thereby relaxing the spectral requirements on the second dichroic reflector.

Although both combiner prism configurations are illustrated here with the first and third color images input from opposite sides of the prism (and thus all principal rays visible in a single cross-section), orientation of the dichroic reflectors may alternatively be chosen so that the first and third color images are input on adjacent faces of the prism, for example, with one color image introduced from a direction into the page. Furthermore, the entire illumination prism may be rotated by 90 degrees, so that both the first and third images are introduced into and out from the page.

If the active-matrix image sources generate unpolarized light, it may be possible to rely on PBS surface 510B to select the S-polarized light, which is delivered to the collimating optics. In this case, the uncollimated P-polarized light which passes straight through the PBS surface continues to the lower surface of the coupling prism where it escapes (since it is not at angles that are internally reflected) and is absorbed by external absorbent material (not shown). Alternatively, polarizers may be incorporated at the surfaces with which active-matrices 605A, 605B, 605C are associated, or a single such polarizer may be positioned between the dichroic combiner prism 606 and the PBS surface 510B, to filter out the P-polarization before it reaches the PBS surface.

All other features of this configuration are similar in structure and function to those of FIG. 1A, above, and are labeled with similar reference numerals. This configuration can also be implemented with a shallower angle of the injected image (analogous to FIG. 1B).

Turning now to the remaining FIGS. 5A-8B, there are shown a family of implementations of an optical system according to the teachings of embodiments of the present invention in which the image plane of the image generator is significantly reduced compared to the previous embodiments, allowing the use of collimating optics which has a focal length which is similar (typically within about +/−50%) to the distance from the collimating optics to the lightguide entrance. As in the earlier embodiments, close proximity of the collimating optics to the lightguide entrance allows a reduction in the size of the optics for a given field of view (FOV). A reduction in the distance from the image plane of the image generator to the collimating optics, and correspondingly in the focal length of the collimating optics, increases the efficiency of light collection from each pixel and enables a larger field of view for a given size of image matrix. Additionally, by making the focal length similar to the distance from the optics to the lightguide entrance, optical aberrations are reduced, and the optics required to correct for aberrations is simplified.

In generic terms, the optical systems of FIGS. 5A-8B include a lightguide 10 having a pair of parallel major surfaces 12*a* and 12*b* supporting propagation of image light by internal reflection at the major surfaces, the lightguide having a lightguide entrance, delimited on one side by a cutoff edge 523. The optical systems also include an image projecting arrangement 2 for generating a collimated image for introduction into the lightguide. The image projecting arrangement 2 includes a polarizing-beam-splitter prism 536 having a first face 630, a second face 632, and a diagonal polarizing beam splitter surface 610. An image-generating matrix 611 or 612 (discussed further below) is associated with first face 630 and defines an image plane. Reflective collimating optics 615, associated with second face 632, is deployed to collimate image light from the image plane reflected by polarizing beam splitter surface 610. Reflective collimating optics 615 has a principal plane PP and an optical axis OA.

The optical systems also include a coupling prism 637, between polarizing beam splitter surface 610 and the entrance to lightguide 10, which provides a coupling surface 638 that is coplanar with, or parallel to, one of the parallel major surfaces 12*b* of lightguide 10. Lightguide 10 and coupling surface 638 are inclined relative to the optical axis OA so that the collimated image from the reflective collimating optics 615 passing through polarizing beam splitter surface 610 enters the lightguide entrance, partly directly and partly after reflection from the coupling surface 638, at angles undergoing internal reflection within the lightguide.

A feature of a group of embodiments of the present invention is that a first light path from the image plane to the principal plane and a second light path from the principal plane to the lightguide entrance are of similar dimensions and are both relatively short. In quantitative terms, use is made again of the reference length RL defined as a distance along the optical axis OA from the principal plane PP to the polarizing beam splitter surface 610. In terms of this reference length, a first light path from the image plane to the principal plane preferably has a length less than 3×RL and a second light path from the principal plane to the lightguide entrance preferably also has a length less than 3×RL. In some cases, the second light path from the principal plane to the lightguide entrance has a length less than 2×RL. This results in particularly compact and efficient optical systems. A number of specific implementations of such optical systems will now be discussed.

In the implementations of FIGS. 5A-7A, the image-generating matrix is an active-matrix image source, which may be an OLED display or more preferably a micro-LED array 611. Most preferably, the micro-LED array is a color display including closely interspaced or otherwise combined pixels of three primary colors. Monolithic micro-LED color displays are commercially available as the PHOENIX™ series from Jade Bird Display (JDB) of Shanghai, China.

In this configuration there is no external illumination and the light from the active-matrix image source 611 enters directly onto the PBS prism 636. In some configurations a field lens 616 may be implemented on the surface of active-matrix image source 611 and/or on the surface 630 of the PBS prism 636. Since there is no requirement for a separate illumination prism, this configuration enables a shorter effective focal length of collimating optics 615, resulting in a larger illumination field and better light collection of the system. The short distance from the reflective collimating optics 615 to the lightguide entrance at 523 enables small and compact optics for a given FOV.

Figure 5A:
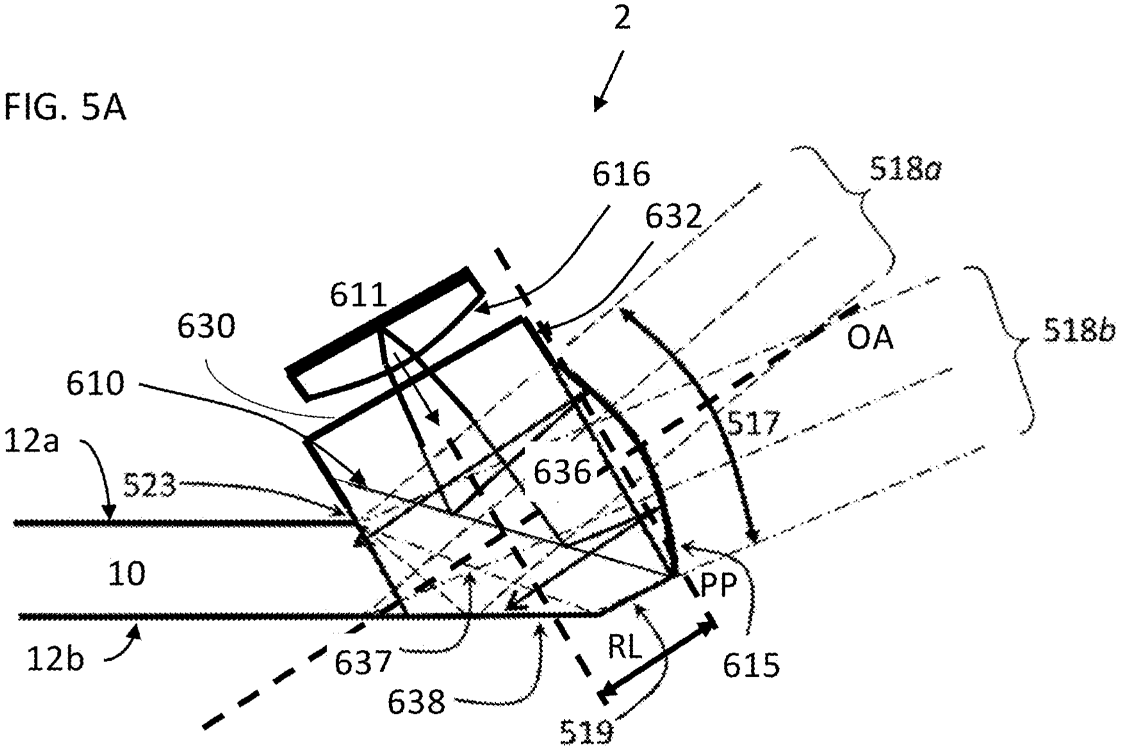
FIG. 5A is a schematic side view of a further optical system, constructed and operative according to the teachings of an embodiment of the present invention, including a compact image projector, employing a color micro-LED array, integrated with a light guide.
Figure 5B:
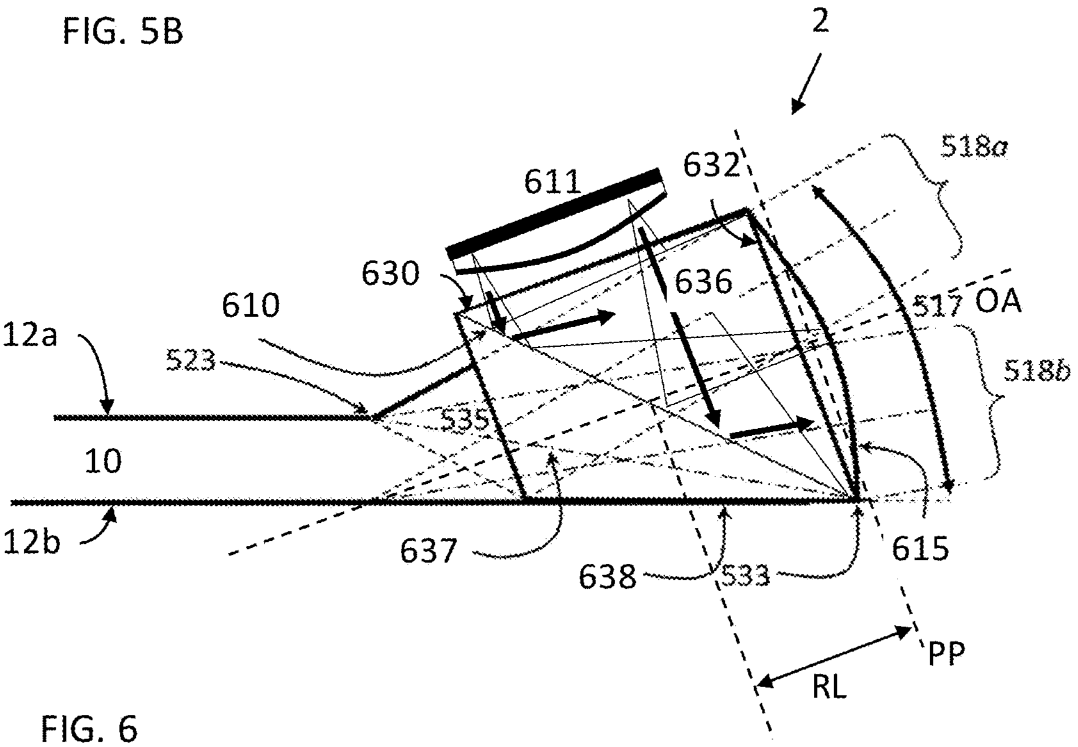
FIG. 5B is a schematic side view of a further optical system, similar to the system of FIG. 5A, implemented for a shallower angle injected image.

FIG. 5A illustrates this configuration for a relatively steep image injection angle, while FIG. 5B illustrates such a configuration for a shallow image injection angle into the lightguide. In the latter case, the shallowest part of the field, labeled 518*b*, includes a ray that originates substantially from the edge of the focusing optics, therefore requiring a relatively long coupling-in surface 638 which extends from just below the PBS surface 610 and is extended by a supplementary coupling prism 535.

Figure 6:
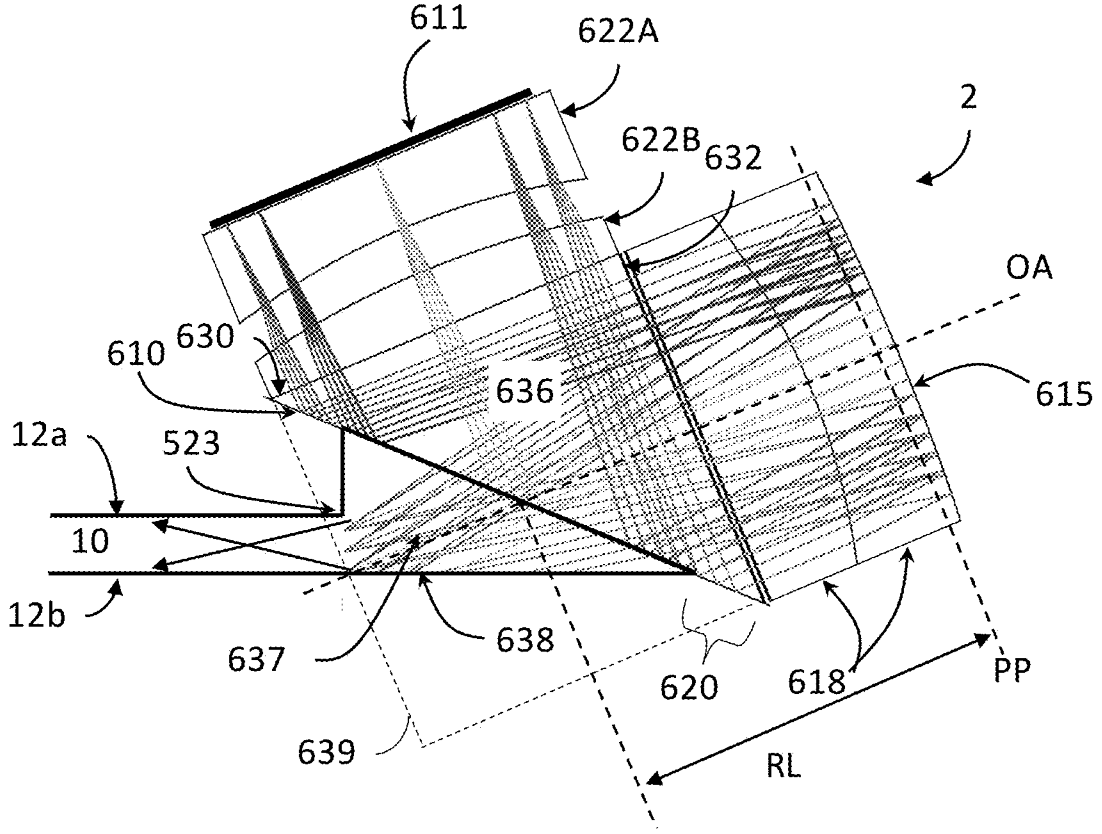
FIG. 6 is a schematic side view of a further optical system, similar to the system of FIG. 5A, illustrating a further reduction in a size of a coupling prism so as to allow reduction in a light path length from the collimating optics to an entrance to the lightguide.

A further reduction in the distance between the collimating optics 615 and the entrance to the lightguide can be achieved using the configuration illustrated in FIG. 6. FIG. 6 shows a case where the required dimensions of PBS surface 610 are larger than the coupling prism entrance dimensions. This is suitable for a case in which a large field of view is projected, requiring complicated and wide optics. Here the light projected from image generator 611 passes through a field lens arrangement including a field lens 622A applied to a surface of the active-matrix image source 611 and another field lens 622B attached to PBS prism surface 630. The sample ray paths as illustrated, passing from the image source 611 through reflection in PBS surface 610 to reflective collimating optics 615, require the entire area of PBS surface 610 as illustrated, referred to as the "active area" of the PBS surface, to fill the lightguide entrance 523 with the full desired FOV. At the same time, the ray paths from the reflective collimating optics 615 to the lightguide entrance 523 pass through only a sub-region of the PBS surface 610. This allows implementation of a coupling prism 637 that contacts only the relevant sub-region of the PBS surface and allows bringing the lightguide entrance closer to the collimating optics.

This configuration satisfies one or more of a number of distinctive geometrical definitions. Firstly, it can be seen that the active area of PBS surface 610 extends on both sides of a plane of the coupling surface 638. Additionally, as defined above, the entrance to lightguide 10 is defined by an optical cutoff edge 523 between the lightguide and coupling prism 637. In this case, a plane passing through the optical cutoff edge 523 perpendicular to the major surfaces 12*a* and 12*b* intersects with the active area of the polarizing beam splitter surface 610.

A further geometrical definition which conveys the proximity of the lightguide entrance to the reflective collimating optics is that the lightguide entrance preferably lies within a virtual cube which would be constructed by providing a mirror image of the upper PBS prism 636 also below PBS surface 610, represented by ghost dashed outline 639.

In all cases, the image light collimated by optics 615 preferably fills the lightguide aperture with light rays corresponding to all parts of the FOV, both directly (downward propagating rays) and after reflection in coupling surface 638 (upwards propagating rays).

Reflective collimating optics 615 is illustrated here in one preferred implementation as a compound refractive-reflective lens which includes a doublet 618 in front of the reflecting surface. The presence of doublet 618 provides the design flexibility to correct chromatic aberrations which may be introduced by other parts of the optical system, including but not limited to, the field lens arrangement 622A, 622B and the coupling-out arrangement for coupling the image towards a viewer's eye. The primary collimating optical power is typically provided by the reflective surface of optics 615, which is, in itself, achromatic.

The "principal plane" PP of reflective collimating optics 615 is defined in the conventional manner, corresponding to a plane at which parallel rays entering from one side of the optical system intersect with the corresponding converging rays on the other side of the optical system while ignoring details of the ray paths within the lens arrangement. A system of lenses has both a principal image plane and a principal object plane, but due to the symmetry of a reflective lens system, these two planes generally coincide. If, as stated above, the primary optical power of the collimating arrangement is in the reflective surface, the principal plane is typically close to that surface.

As mentioned above, the coupling reflector 638 may be either coplanar with, or parallel to, the major lightguide surface 12*b*. The particular significance of implementing coupling surface 638 parallel to major surface 12*b* but with a slight offset will now be described with reference to FIGS. 7A and 7B.

Practically, the attachment between lightguide 10 and coupling prism 637 presents engineering challenges. Specifically, where coupling prism 637 is attached to lightguide 10 by index-matched optical adhesive, it is challenging to achieve a high-quality continuous surface from coupling surface 638 across the adhesive boundary to lightguide surface 12*b*. Any imperfections in the surface at that boundary may cause scattering that will propagate in the lightguide and reduce image quality. This problem becomes more pronounced in designs in which an additional optical element (such as a wave-plate, depolarizer or other element) is introduced at the interface between the coupling prism and the lightguide, resulting in additional transitions between different optical materials with different physical properties, and thus further hampering attempts to achieve a continuous high-optical-quality surface.

Figure 7A:
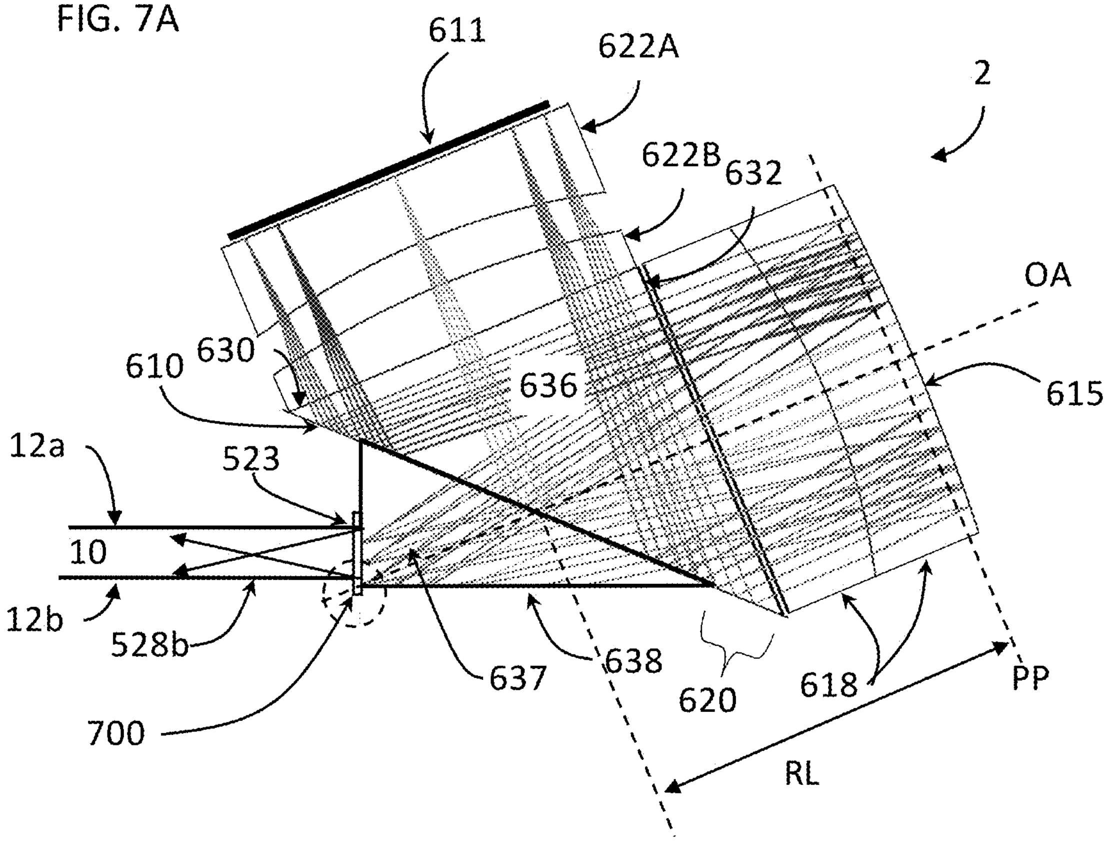
FIG. 7A is a schematic side view similar to FIG. 6 illustrating an implementation with a coupling surface which is non-coplanar with surfaces of the lightguide.
Figure 7B:
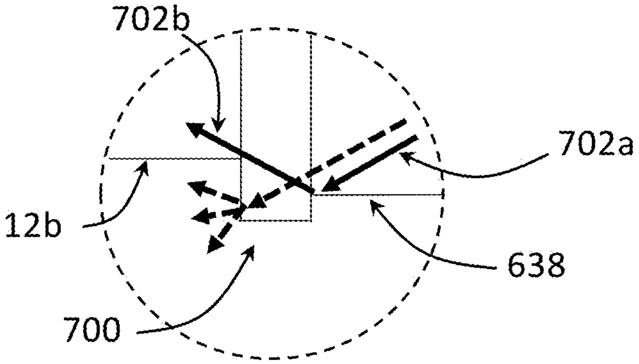
FIG. 7B is an expanded view of the region of FIG. 7A designated VII.

FIGS. 7A and 7B illustrate how a small step between the elements at the junction between the coupling prism 637 and the lightguide 10, even in the case of an additional interposed optical element 700, can eliminate or at least reduce the amount of scattered light which enters and is guided within lightguide 10.

In the example illustrated here, surface 638 of coupling prism 637 is offset downwards (outwards) relative to the parallel surface 12*b* of lightguide 10 so that not all the light impinging on the interface will enter the lightguide. The extent of the shift between 638 and 12*b* is preferably minimal and defined such that the last ray 702*a* impinging on the edge of surface 638 before the perturbation at the boundary (either with optical element 700 or with the lightguide 10) will be reflected as ray 702*b* to enter at the entrance edge of 12*b*, while rays that impinge on the perturbation (i.e., at or just beyond the interface boundary) and are scattered (dashed arrows) do not enter the lightguide. This condition should be satisfied for the steepest rays entering the lightguide and will thus also be satisfied for shallower rays.

Figure 8A:
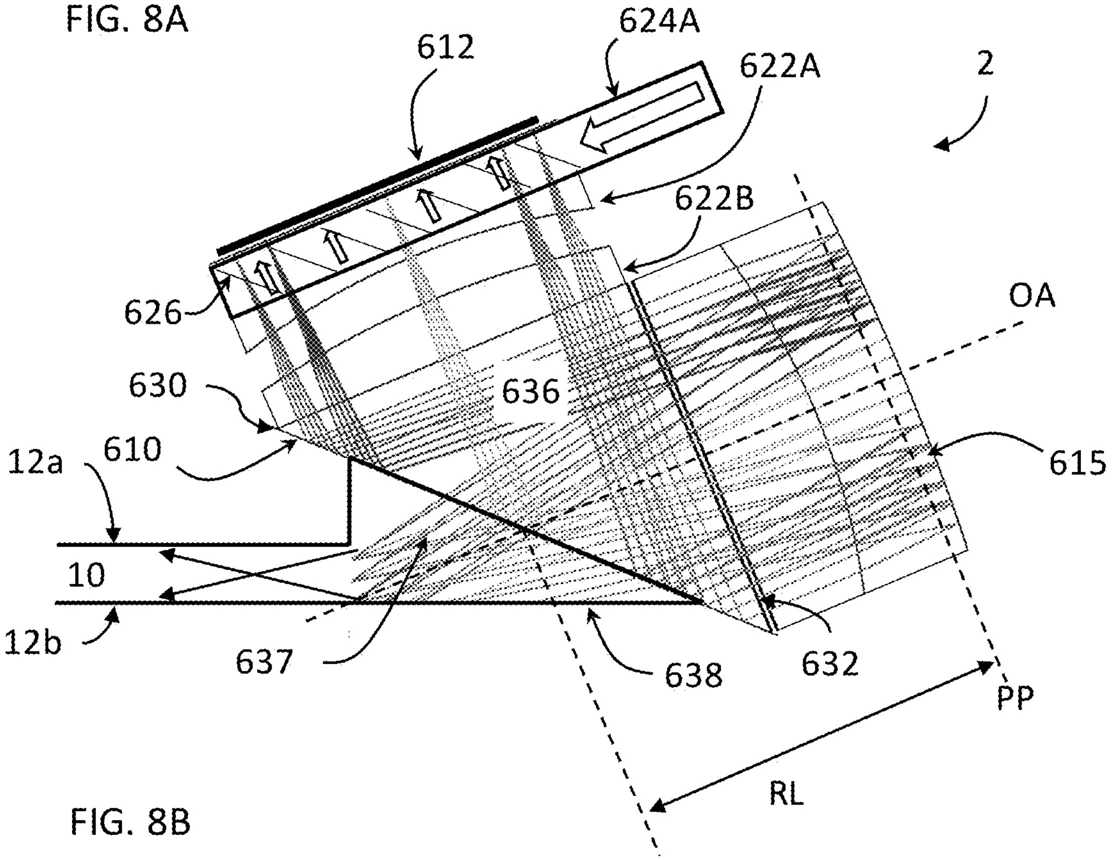
FIG. 8A is a schematic side view of a further optical system similar to FIG. 6 but employing a reflective polarization-modulating spatial light modulator illuminated via an illumination lightguide.
Figure 8B:
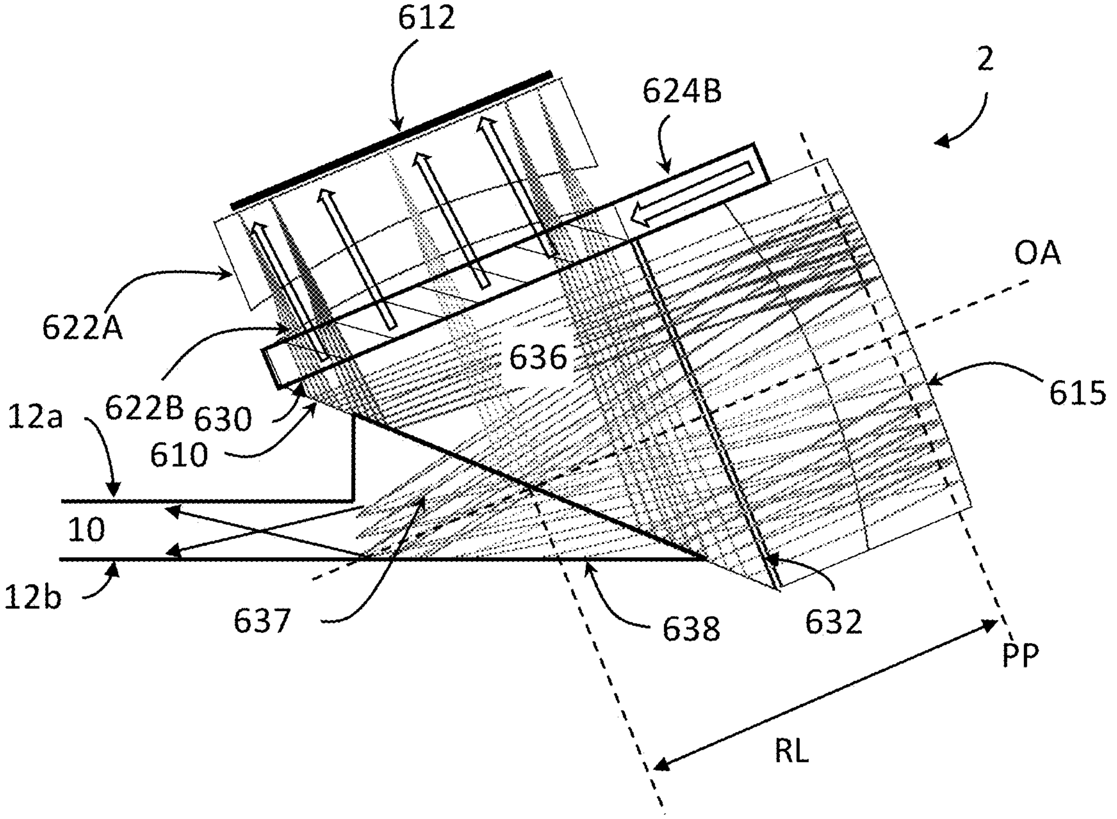
FIG. 8B is a view similar to FIG. 8A illustrating a variant implementation of the illumination lightguide.

Turning now to FIGS. 8A-8B, this particularly compact optical system can also be implemented using an image-generating matrix implemented as a reflective spatial light modulator (SLM), such as a liquid-crystal-on-silicon (LCOS) modulator 612. In order to reduce the light path from the SLM to the collimating optics to less than 3×RL, the optical system preferably employs a lightguide-based illumination arrangement interposed between the SLM 612 and the first face 630 of the polarizing-beam-splitter prism 636. The illumination arrangement employs an illumination lightguide 624A, 624B having two mutually parallel surfaces for guiding illumination across the SLM by internal reflection within the illumination lightguide, and having a set of internal partially-reflecting surfaces 626 for progressively redirecting S-polarized illumination out of the illumination lightguide towards the SLM. The reflected image that is P-polarized is reflected from the LCOS and passes through facets 626 so as to pass into the PBS prism 636. To manage the polarization, the system may include a polarizer after the lightguide (on top of the PBS) to filter out the non-image S-polarization.

The image light entering PBS prism 636 should typically be S-polarization relative to the PBS surface 610. This can be achieved either by including a half-wave retarder plate between the illumination lightguide (or subsequent polarizer) and the PBS prism or by rotating the illumination arrangement 90 degrees relative to the PBS prism so that the illumination would be injected into the page of the drawing (not shown). This second option results in the P-polarized image light relative to illumination facets 626 being S-polarized relative to PBS surface 610. Optionally, in either of these cases, the PBS surface 610 may itself serve as a filter for the S-polarization image light from the LCOS. In such a case, any P-polarized light traversing the PBS surface 610 will escape from the optics, since it reaches the lower surface of the coupling prism at angles which do not undergo internal reflection, where it is preferably absorbed by absorbing material external to the optical arrangement.

It is typically advantageous to incorporate a field lens arrangement of at least one field lens 622A, 622B, between SLM 612 and the first face of the polarizing-beam-splitter prism 630. In the example of FIG. 8A, the illumination arrangement is directly associated with the SLM and the field lenses are deployed between the illumination arrangement and the PBS prism 636.

FIG. 8B illustrates a further preferred option in which at least one lens 622A of the field lens arrangement is integrated with the SLM, and the illumination lightguide 624B is placed on the side of the field lens(es) further from the SLM 612. This architecture has the further advantage that illumination lightguide 624B is significantly removed from the image plane, thereby reducing the risk that the facet pattern might be visible as a perturbation of the image.

Both configurations of FIGS. 8A and 8B illustrate that a highly compact image projector can be integrated with lightguide 10 even when using a reflective SLM.

In all the above configurations, the image projector configurations inject P-polarization into the lightguide (unless intentionally further modified). This polarization is preferable in many lightguide configurations, as discussed above with reference to FIGS. 2A and 2B.

It will be appreciated that the above descriptions are intended only to serve as examples, and that many other embodiments are possible within the scope of the present invention as defined in the appended claims.

What is claimed is:

1. An optical system comprising:

(a) a lightguide having a pair of parallel major surfaces supporting propagation of image light by internal reflection at the major surfaces, said lightguide having a lightguide entrance;

(b) an image projecting arrangement for generating a collimated image for introduction into said lightguide, said image projecting arrangement comprising:

(i) a polarizing-beam-splitter prism having a first face, a second face, and a diagonal polarizing beam splitter surface, (ii) an image-generating matrix associated with said first face, said image-generating matrix defining an image plane, and (iii) reflective collimating optics associated with said second face and deployed to collimate image light from said image plane reflected by said polarizing beam splitter surface, said reflective collimating optics having a principal plane and an optical axis; and (c) a coupling prism between said polarizing beam splitter surface and said lightguide entrance, said coupling prism providing a coupling surface that is coplanar with, or parallel to, one of said parallel major surfaces, wherein said lightguide and said coupling surface are inclined relative to said optical axis so that the collimated image from said reflective collimating optics passing through said polarizing beam splitter surface enters said lightguide entrance, partly directly and partly after reflection from said coupling surface, at angles undergoing internal reflection within said lightguide, and wherein a reference length RL is defined as a distance along said optical axis from said principal plane to said polarizing beam splitter surface, a first light path from said image plane to said principal plane having a length less than 3×RL and a second light path from said principal plane to said lightguide entrance having a length less than 3×RL.

2. The optical system of claim 1, wherein said second light path from said principal plane to said lightguide entrance has a length less than 2×RL.

3. The optical system of claim 1, wherein light rays of said collimated image entering said lightguide entrance span an angular field of view, and wherein said angular field of view is provided by image light reaching said reflective collimating optics from said image plane after reflection from an active area of said polarizing beam splitter surface, said active area extending on both sides of a plane of said coupling surface.

4. The optical system of claim 3, wherein said entrance to said lightguide is defined by an optical cutoff edge between said lightguide and said coupling prism, and wherein a plane passing through said optical cutoff edge perpendicular to said major surfaces intersects with said active area of said polarizing beam splitter surface.

5. The optical system of claim 1, wherein said image-generating matrix is a micro-LED array.

6. The optical system of claim 5, further comprising a field lens arrangement comprising at least one lens, said field lens arrangement being between said micro-LED array and said first face of said polarizing-beam-splitter prism.

7. The optical system of claim 6, wherein at least one lens of said field lens arrangement is integrated with said micro-LED array.

8. The optical system of claim 1, wherein said image-generating matrix is a reflective spatial light modulator (SLM), the optical system further comprising an illumination arrangement interposed between said SLM and said first face of said polarizing-beam-splitter prism, said illumination arrangement comprising an illumination lightguide having two mutually-parallel surfaces for guiding illumination across said SLM by internal reflection within said illumination lightguide, said illumination lightguide including a set of internal partially-reflecting surfaces for progressively redirecting the illumination out of the illumination lightguide towards said SLM.

9. The optical system of claim 8, further comprising a field lens arrangement comprising at least one lens, said field lens arrangement being between said SLM and said first face of said polarizing-beam-splitter prism.

10. The optical system of claim 9, wherein at least one lens of said field lens arrangement is integrated with said SLM.

11. An optical system comprising:

(a) a lightguide having a pair of parallel major surfaces supporting propagation of image light by internal reflection at the major surfaces, said lightguide having a lightguide entrance;

(b) an image projecting arrangement for generating a collimated image for introduction into said lightguide, said image projecting arrangement comprising:

(i) first, second and third micro-LED arrays configured for generating, respectively, images of first, second and third colors, (ii) a dichroic combiner having first, second and third input surfaces supporting, respectively, said first, second and third micro-LED arrays, said dichroic combiner including a first diagonally deployed dichroic reflector, selectively reflective for the first color and transmissive for the second color and the third color, and a second diagonally-deployed dichroic reflector, selectively reflective for the third color and transmissive for the second color, (iii) a polarizing-beam-splitter prism, associated with said dichroic combiner, having a diagonal polarizing beam splitter surface, and (iv) reflective collimating optics associated with a face of said polarizing-beam-splitter prism and deployed to collimate image light from said first, second and third micro-LED arrays that was combined by said dichroic combiner and reflected by said polarizing beam splitter surface, said reflective collimating optics having a principal plane and an optical axis; and (c) a coupling prism between said polarizing beam splitter surface and said lightguide entrance, said coupling prism providing a coupling surface that is coplanar with, or parallel to, one of said parallel major surfaces, wherein said lightguide and said coupling surface are inclined relative to said optical axis so that the collimated image from said reflective collimating optics passing through said polarizing beam splitter surface enters said lightguide entrance, partly directly and partly after reflection from said coupling surface, at angles undergoing internal reflection within said lightguide, and wherein a reference length RL is defined as a distance along said optical axis from said principal plane to said polarizing beam splitter surface, a light path from said principal plane to said lightguide entrance having a length less than 3×RL.

12. The optical system of claim 11, wherein the light path from said principal plane to said lightguide entrance has a length less than 2×RL.

13. The optical system of claim 11, wherein said second dichroic reflector is transparent to said first color, and wherein said second dichroic reflector is deployed non-parallel to said first dichroic reflector so as to intersect said first dichroic reflector.

* * * * *